Aug. 22, 1967  B. GOURDON ET AL  3,337,638
INVERSE FLAME PROCESS FOR THE MANUFACTURE OF MERCAPTANS
Filed Sept. 11, 1964

INVENTORS
BERNARD GOURDON
FRANCOIS POULIQUEN
BY
OSTROLENK, FABER, GERB & SOFFEN
ATTORNEYS

3,337,638
INVERSE FLAME PROCESS FOR THE MANUFACTURE OF MERCAPTANS
Bernard Gourdon and Francois Pouliquen, Pau, France, assignors to Societe Nationale des Petroles d'Aquitaine, Paris, France
Filed Sept. 11, 1964, Ser. No. 395,856
Claims priority, application France, Sept. 23, 1963, 948,369
8 Claims. (Cl. 260—609)

The object of the present invention is a new process for the manufacture of mercaptans, and more especially methyl mercaptan. The process is especially concerned with the preparation of these compounds from hydrogen sulfide and one or more hydrocarbons, especially aliphatic hydrocarbons.

The conventional procedure for obtaining alkyl mercaptans consists in causing hydrogen sulfide to react with an alcohol in the presence of a catalyst which is, for example, formed by alumina.

Thus, the known process requires a more or less costly initial material, which is the alcohol corresponding to the alkyl mercaptan to be manufactured. Even in the most usual case of the manufacture of methyl mercaptan from $H_2S$ and methanol, this latter, although the least expensive of all the alcohols, still considerably increases the cost price of the manufactured product.

The present invention, on the other hand, makes it possible for alkyl mercaptans to be manufactured without having to use an alcohol as an initial material. It renders possible the use of hydrocarbons comprising the desired alkyl radical or radicals instead of the corresponding alcohols; these hydrocarbons are always less costly and are of particular interest in the case of methyl mercaptan, where the use of methane in the form of natural gas becomes extremely economical.

The new process according to the invention consists in causing hydrogen sulfide to react with one or more hydrocarbons by feeding an inverse flame with a mixture of hydrogen sulfide and hydrocarbon, and immediately cooling the reaction products thus formed.

As known the term "inverse flame" designates a flame produced by a combustion in which the combustible gas to be burnt is fed in the form of a stream which surrounds the stream of combustion supporter (particularly oxygen), instead of being surrounded by the supporter as in conventional flames.

Preferably, the proportion of $H_2S$ relatively to that of the hydrocarbon is equal to or in the region of the stoichiometric ratio.

According to one preferred embodiment, a gaseous mixture of hydrogen sulfide and hydrocarbon is subjected to a partial combustion in oxygen, the gaseous mixture being in a large excess with respect to the latter; preferably, the oxygen is brought into contact with only a part of the mixture so as to establish a flame capable of bringing all the gas to high temperature.

One particular advantageous form of the invention thus consists in producing an inverse flame with hydrogen sulfide and the hydrocarbon, the supporter of combustion being oxygen, optionally diluted with nitrogen, admitted in the form of a central stream or jet within the said gases.

This method of procedure permits methyl mercaptan to be manufactured economically by partial combustion of $H_2S$ and $CH_4$ in an inverse flame.

Although the mechanism of the reaction is not entirely known and although this does not in any way limit the present invention, it is believed that methane and hydrogen sulfide, brought to the high temperature of the flame, give rise to free radicals which are respectively $CH_3$ and $SH$; the combination of these latter leads to the mercaptan $CH_3SH$.

Similar reaction occurs with other aliphatic hydrocarbons, more particularly with the lower ones, especially ethane and propane, which give, respectively, the corresponding ethylmercaptan and propylmercaptan.

According to one particular feature of the invention which is quite important, the products of the reaction, especially the gases discharged from the inverse flame, are rapidly cooled. This cooling or quenching, which is already realized by the gases themselves, feeding the inverse flame, can be amplified by any means which are known per se, for example, by means of a heat exchanger positioned at the apex of the flame.

The rapid cooling of the gases leaving the flame chemically protects these gases against a subsequent oxidation.

In carrying the new process into effect, it is expedient to cause the central jet of the substance supporting combustion to pass into an annular gas stream formed by an intimate mixture of $H_2S$ and hydrocarbon. It is also possible to create the inverse flame by three concentric gaseous streams, two separate streams of $H_2S$ and hydrocarbon surrounding the stream of the substance supporting combustion. In this case, the outermost annular stream may be formed by the hydrocarbon or by $H_2S$, and it is this latter arrangement which is most suitable.

The inverse flame for carrying into effect the preferred form of the invention can be obtained by means of any known device. In order to illustrate the invention, three different burners corresponding to three non-limiting embodiments are shown diagrammatically in the accompanying drawing.

Figure 1:
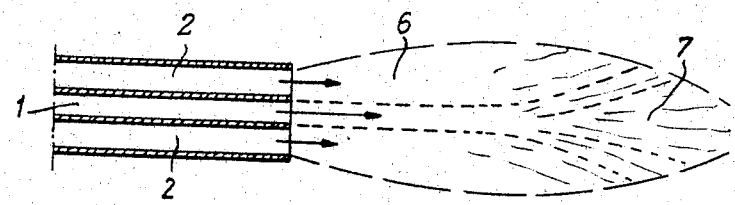
FIGURE 1 is an axial section showing the end of a conventional burner.

The burner of FIGURE 1 is used with a current of air, or optionally oxygen by itself or diluted to a greater or lesser extent with an inert gas, blown through the central nozzle 1; more often than not mixtures of oxygen with nitrogen are used, which contain 10 to 99% oxygen by volume. An intimate mixture of hydrogen sulfide and hydrocarbon, prepared in advance, is delivered through the annular space 2. When the gas is ignited at the end of the burner, the inverse flame thus created has necessarily very little oxygen in the region 6; since, on the other hand, the rates of flow are generally regulated so as to have a deficiency of the substance supporting combustion (oxygen) with respect to the combustible agents which are present, the hot part 7 of the flame itself contains an excess of hydrocarbon and $H_2S$.

Preferably, the proportion of oxygen fed to the inverse flame according to the invention is 10% to 80%, and particularly 20% to 50%, of that which would be required theoretically for producing mercaptan. That means the preferred volume of oxygen is comprised between $\frac{1}{50}$ and $\frac{1}{6}$ of total volume of hydrogen sulfide and hydrocarbon.

Figure 2:
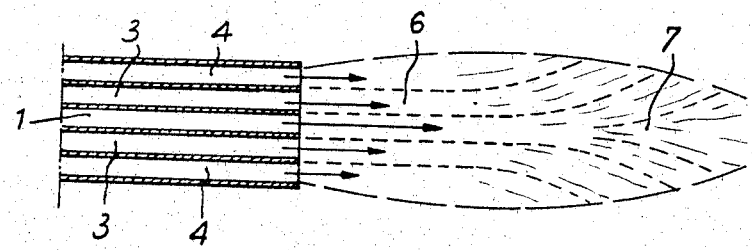
FIGURE 2 is a view, also as an axial section, of the end portion of a burner comprising three concentric tubes.

In the burner as illustrated in FIGURE 2, the oxygen containing combustion supporter is always blown through the central tube 1, but the $H_2S$ and the hydrocarbon arrive separately; the first is supplied through the annular space 3 directly surrounding the tube 1 and the second by the annular conduit 4 which surrounds the space 3.

Figure 3:
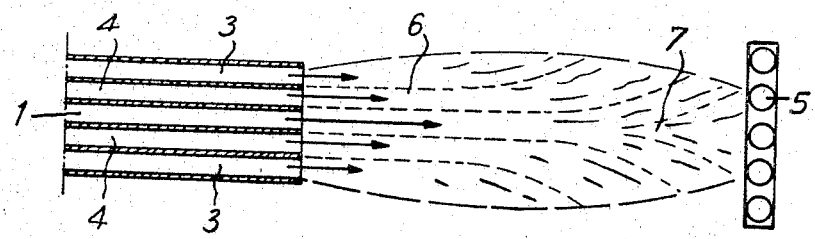
FIGURE 3 shows the burner of FIGURE 2, followed by a cooling arrangement.

The burner shown in FIGURE 3 is the same as that of FIGURE 2, but in this case, to the contrary, the conduit 4 supplying the hydrocarbon surrounds the air tube 1, while the annular space 3 intended for the H₂S is on the outside, around the conduit 4.

In addition, a heat exchanger is situated in front of the burner shown in FIGURE 3, and the tubes 5 of the said exchanger, seen in transverse section, are traversed by a cooling fluid.

It is obvious that the burners as illustrated are fitted with means for the supply of gas or possibly liquid to the respective different tubes 1, 2, 3 and 4.

The following non-limiting examples illustrate the invention.

Example 1

A burner according to FIGURE 1 is supplied with an intimate mixture of 100 liters of H₂S and 100 liters of CH₄ per hour through the annular tube 2; air is blown into the central tube 1 at the rate of 50 liters per hour, this corresponding to 5% of oxygen with respect to the volume of the reagents. These rates of flow correspond to a large excess of H₂S plus CH₄ mixture with respect to oxygen; in actual fact, the stoichiometric proportion of air would be 250 liters for 200 liters of this mixture, instead of the 50 liters which are used, if based on the total reaction,

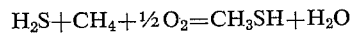

$$H_2S + CH_4 + \tfrac{1}{2} O_2 = CH_3SH + H_2O$$

The combustion which takes place in the inverse flame of the burner thus only affects a small fraction of the reagents. At the outlet of the apparatus, the gases are cooled with a view to condensing the methyl mercaptan which has formed. By carrying out this condensation at the temperature of liquid nitrogen and by then evaporating the condensate which is obtained by successive temperature steps, 10% of methyl mercaptan was found in the residue of the evaporation at 0° C.

Example 2

The burner shown in FIGURE 3 was fed with methane at the rate of 100 l./hr. through the pipe 4 directly surrounding the central air supply pipe 1; the hydrogen sulfide arrived at the rate of 100 l./hr. through the external annular space 3. The central tube 1 delivered 20 liters of oxygen per hour, i.e. 10% of the total volume of the two reagents. The fumes resulting from the flame were suddenly cooled by means of the heat exchanger 5 disposed in the form of a ring at the apex of the flame. After condensation of the fumes at the temperature of liquid nitrogen, followed by evaporation in stages, a determination carried out as in Example 1 indicated the presence of 15% of methyl mercaptan in the residual fraction of the evaporation at 0° C.

Example 3

When substituting ethane for the methane in the procedure of Example 1, there are 6% of ethylmercaptan obtained.

Example 4

Propane being used instead of methane in Example 1, the proportion of propylmercaptan formed is about 3%.

We claim:

1. Process for the manufacture of a mercaptan, which consists in reacting hydrogen sulfide with an aliphatic hydrocarbon selected from the group consisting of methane, ethane and propane by feeding an inverse flame, the central vein of which is a mixture of nitrogen and oxygen, with hydrogen sulfide and said aliphatic hydrocarbon, and immediately cooling the reaction products formed in the flame.

2. Process for the manufacture of a mercaptan, which consists in reacting hydrogen sulfide with an aliphatic hydrocarbon selected from the group consisting of methane, ethane and propane by feeding an inverse flame, the central vein of which is a mixture of nitrogen and oxygen containing 10% to 90% oxygen by volume, with hydrogen sulfide and said hydrocarbon and rapidly cooling the reaction products formed in the flame.

3. Process for the manufacture of a mercaptan, which consists in reacting hydrogen sulfide with methane by feeding an inverse flame, the central vein of which is a mixture of nitrogen and oxygen containing 10% to 99% oxygen by volume, with hydrogen sulfide and an approximately stoichiometric amount of methane, rapidly cooling the reaction products formed in the flame, and separating methylmercaptan therefrom by condensation.

4. Process for the manufacture of a mercaptan, which consists in reacting hydrogen sulfide with methane by feeding an inverse flame, the central vein of which is a mixture of nitrogen and oxygen containing 10% to 99% oxygen by volume, with hydrogen sulfide and an approximately stoichiometric amount of methane, while the volume of oxygen is 1/50 to 1/6 of the total volume of hydrogen sulfide and methane, rapidly cooling the reaction products formed in the flame, and separating methylmercaptan therefrom by condensation.

5. Process according to claim 4, wherein the hydrogen sulfide and methane are previously intimately mixed.

6. Process according to claim 4, wherein the hydrogen sulfide arrives into the flame as an annular stream around an annular stream of methane.

7. Process according to claim 4, wherein the methane arrives into the flame as an annular stream around an annular stream of hydrogen sulfide.

8. Process according to claim 4, wherein the gaseous material formed by the flame is suddenly cooled in the region of the apex of the flame.

References Cited

Reid: Chemistry of Bivalent Sulfur, vol. 1, page 19.

CHARLES B. PARKER, *Primary Examiner.*

D. R. PHILLIPS, *Assistant Examiner.*